May 11, 1965　　O. P. FRANKERT　　3,183,106

METHOD OF MAKING CEMENT

Filed July 10, 1962

INVENTOR
OTTO PEDER FRANKERT

BY

ATTORNEYS 3,183,106
METHOD OF MAKING CEMENT
Otto Peder Frankert, Copenhagen-Valby, Denmark, assignor to F. L. Smidth & Co., New York, N.Y., a corporation of Delaware
Filed July 10, 1962, Ser. No. 208,765
Claims priority, application Great Britain, July 24, 1961, 26,744/61
8 Claims. (Cl. 106—103)

This invention relates to a method of making cement and, more particularly, to a method in which a latent hydraulic binder is dried at the same time that it is ground together with a cement clinker.

Cement may be made by grinding together a slag or other latent hydraulic binder and a cement clinker along with or without such other constituents as gypsum. The binder most commonly used is blast furnace slag which is normally available in a granulated form and which results from cooling molten slag taken from a blast furnace with water. Such slag usually has a high moisture content on the order of 15% to 30% water and often the moisture content may be even greater.

Slag or any other latent hydraulic binder capable of contributing to the hardening of cement requires the presence of a free lime acting as a catalyst and thus is never used alone as a cement. A latent hydraulic binder alone may have a considerable water content without setting taking place, but, as soon as it is mixed with a small amount of cement clinker containing free lime, it will set. A latent hydraulic binder, particularly one mixed with Portland cement clinker, is highly sensitive to moisture whether the clinker content is high or low.

Heretofore, in the manufacture of cement, the moist slag or other binder was dried before being mixed and ground with the cement clinker and any of the other constituents that might be included. This separate and additional step of drying the binder was effected on a grate, in a heated drum, or by de-watering the binder in a centrifuge until the moisture content of the binder was brought down to about 4% or 5%. The extra drying step was required even when other latent hydraulic binders besides blast furnace slag were utilized, such as fly ash from power stations or volcanic ash, where the ash contains approximately 25% of moisture. It is, therefore, an object of my invention to reduce the cost of manufacture of cement by eliminating the separate step of drying the hydraulic binder.

Broadly, my invention contemplates drying the latent binder by subjecting it to a gas heated to a temperature of 500°–700° C. at the same time that it is being ground with the clinker in a grinding mill and also utilizing the heat arising from the grinding operation itself for drying purposes. Further, the rate of drying is controlled so that none of the constituents of the cement will be damaged by the application of excessive heat.

The proportions of the mixture that is ground may vary considerably and my invention is applicable to the production of any cement in which a latent hydraulic binder is a main constituent and amounts to from 15% to 85% of the cement mixture by weight.

The gas used for drying the latent binder is itself heated to a temperature of approximately 500°–700° C. and serves not only to dry the binder but also to carry the water evaporated from the binder out of the grinding mill. A portion of the gas may be recirculated through the mill to reduce the cost of production further.

Several modes of application of the invention are shown in the accompanying drawings, in which.

Figure 3:
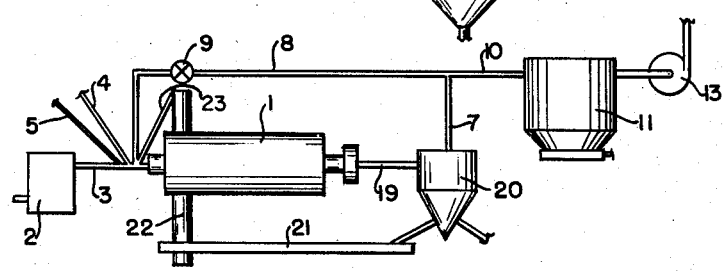
Figure 4:
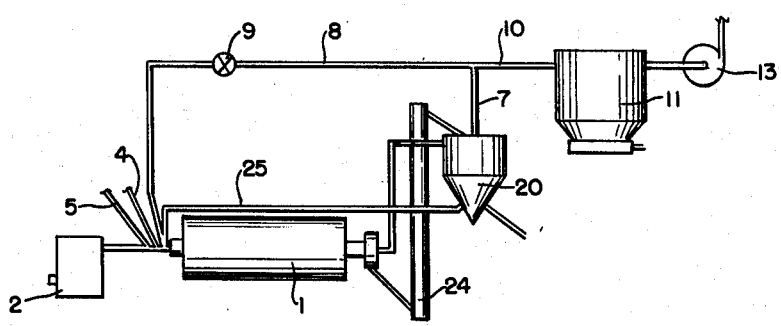

FIG. 3 is a schematic view of an installation for closed circuit grinding of cement clinker plus a hydraulic binder in which a coarse fraction from a separator is returned to the mill for further grinding; and FIG. 4 is a schematic view of an installation similar to that shown in FIG. 3 but in which a part of the material removed is separated into a fine and a coarse fraction with the coarse fraction returned to the mill.

Figure 1:
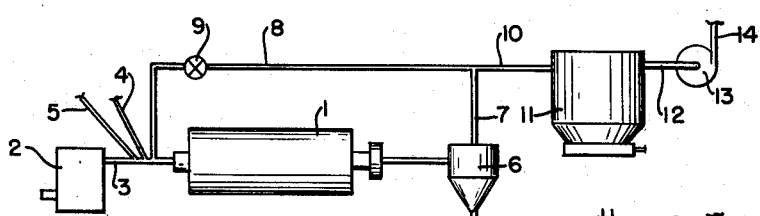
FIG. 1 is a schematic view of an installation for grinding cement clinker and a hydraulic binder with the ground product removed from the grinding mill by the hot drying gas.

The installation shown in FIG. 1 includes a grinding mill having a chamber 2 for heating the drying gas which is passed into the mill through a supply pipe 3. The clinker and slag are supplied to the mill through respective conduits 4 and 5 discharging into the pipe 3. The ground cement issues from the mill in suspension in the gases and is separated therefrom in a cyclone separator 6. The gases leave the separator through an outlet conduit 7 connected to a line 8 containing a valve 9 and discharging into the supply 3 adjacent to the mill 1. The conduit 7 is also connected by a line 10 to the inlet of an electrical precipitator 11 having its gas outlet connected by a line 12 to the intake of a draft fan 13 with an outlet pipe 14.

Adjustment of the valve 9 permits a controlled amount of the gas issuing from the cyclone to be recirculated through the mill to improve the fuel economy but the relative proportions of recirculated and fresh gas passing through the mill must be so adjusted that the gas passing through the mill has the required drying capacity. For this purpose, part of the gas leaving the mill should be passed to atmosphere and replaced by a corresponding amount of fresh hot gas in order to prevent saturation of the recirculated gas with moisture.

Figure 2:
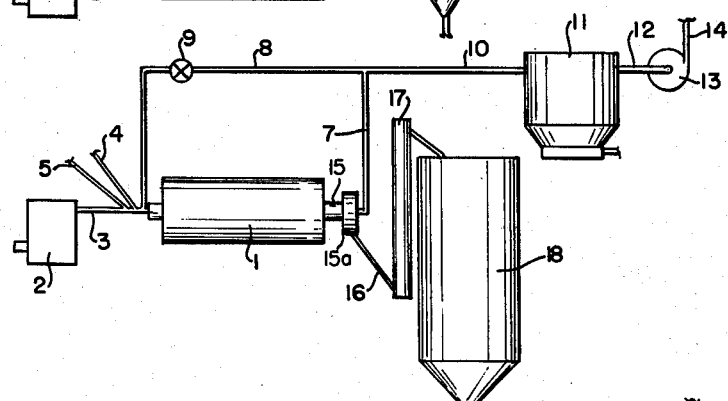
FIG. 2 is a schematic view of an installation similar to that shown in FIG. 1 except that the finished material is removed from the grinding mill by gravity and subsequently passed to a silo by means of an elevator.

If the gas velocity through the mill is insufficient, only a part of the ground product will leave the mill in suspension in the gas and the remainder will be discharged through the hollow outlet trunnion 15 of the mill, as shown in FIG. 2. The FIG. 2 installation is the same as that shown in FIG. 1 except that the ground product is removed from the mill by gravity and passes directly from the trunnion 15 through the discharge casing 15a and a line 16 to an elevator 17 which discharges into a silo 18.

The grinding installation illustrated in FIG. 3 is for closed circuit grinding with the ground product first passing through a line 19 to a separator 20. From the separator a coarse fraction is returned to the mill for further grinding by means of a conveyor 21, an elevator 22, and a pipe 23 to the supply pipe 3 leading to the inlet of the mill.

The installation shown in FIG. 4 differs from that of FIG. 3 in that part of the ground product from the mill is passed to a separator 20 by means including an elevator 24, while the remainder is conveyed to the separator in suspension in the gas stream. In the separator, the product is separated into a fine and a coarse fraction and the latter is returned to the mill through line 25 for further grinding.

If moisture content of the cement mixture is high, as, for example, 10% by weight, either because the binder content of the mixture is high or the moisture content of the binder is very high, as, for example, 30% to 40%, the temperature of the gases entering the mill have to be extremely high, as, for example, 700° C. to 800° C., in order to achieve the desired drying of the binder. Under such circumstances, it is desirable to effect partial drying of the binder while the binder is being mixed with the clinker but before grinding of the resulting mixture takes place. This partial drying of the mixture may take place outside of the grinding mill in a preliminary drying chamber, in which the clinker and binder are mixed together before entering the grinding mill. By utilizing such a preliminary chamber, very hot gas may be used to effect drying and, when the gas reaches the mill inlet, it will have cooled enough so as not to damage the hollow trunnion bearing at the inlet end of the mill.

The drying effect of the gas flow through the various installations shown in the drawings is determined by the product of the gas flow per unit of time and the gas temperature. The volume of gas flowing through the grinding mill per unit of time must not be so high as to remove all of the ground particles mixture which are insufficiently ground or dried. Accordingly, in carrying out the method, both the volume of the gas passing through the mill and the temperature of the gas must be taken into account.

It has been found that, when slag is a constituent of the cement mixture, it often tends to be sticky in the portion of the mill adjacent the inlet. If this is the case, the product of the gas flow per unit of time and the temperature of the gas should be large enough to accelerate the drying of the slag and thus eliminate the tendency toward stickiness.

In grinding cement, it is desirable to cool the ground product to a temperature low enough to enable the material to be packed directly into paper bags without damage to the bags and, for this purpose, cooling water may be sprayed into the mill at the outlet end. The sprayed water increases the moisture content of the effluent gas and this is beneficial when the gas passes through an electrostatic dust precipitator before escaping into the atmosphere. In the present invention, the amount of water sprayed into the mill should not exceed that which will evaporate immediately after its introduction into the mill and thus not remoisten the dried binder.

When gypsum is used as a constituent of the cement mixture, it is desirable that the gypsum be moistened before it is mixed with the other constituents in order to prevent its being burnt when exposed to the hot gas in the mill. If this is not done, extra care must be taken to ensure that the gases are not too hot when brought in contact with the gypsum and also to prevent too much heat being supplied by the gas to the mill in relation to the amount of water that is evaporated from the binder in the mill.

In the foregoing specification and the following claims, I intend the term "latent hydraulic binder" to include not only blast furnace slag, fly ash from power stations, and volcanic ash but also pozzolana, trass, tufa, and santorin earth, all of which have the property of setting in the presence of free lime acting as a catalyst.

I claim:

1. A method of making cement comprising the steps of grinding a mixture of cement clinker and at least one hydraulic binder, the binder initially containing an amount of moisture which would cause setting of the binder in the presence of the clinker, and, during such grinding, drying the binder before it sets by subjecting the binder to the section of a drying gas at a temperature of 500°–700° C.

2. The method of claim 1 wherein the heat generated by the grinding operation is utilized to effect partial drying of the binder.

3. The method of claim 1 comprising the additional step of subjecting the mixture to the drying gas before grinding to effect partial preliminary drying of the binder.

4. The method of claim 1 comprising the additional step of cooling the ground mixture by spraying water upon the mixture in the grinding zone at such a rate that the water will evaporate immediately after its introduction into the zone.

5. The method of claim 1 wherein a portion of the drying gas acting on the mixture being ground is withdrawn from the grinding zone and recirculated to the zone to effect further drying of the binder.

6. A method of making a cement mixture containing quenched blast furnace slag and Portland cement clinker comprising the steps of grinding the slag and clinker in a grinding mill, the slag initially containing an amount of moisture which would cause setting of the slag in the presence of the clinker, continuously supplying moist slag and clinker to the mill, continuously removing the resultant ground product from the mill, and drying the slag before it sets by passing a drying gas at a temperature of 500°–700° C. through the mill.

7. The method of claim 6 comprising the additional step of removing the ground product from the mill in suspension in the gas leaving the mill.

8. The method of claim 7 having the additional step of returning to the inlet of the mill a portion of the gas leaving the mill through the mill outlet.

References Cited by the Examiner

UNITED STATES PATENTS 2,819,172   1/58   Trief _____ 106—102

FOREIGN PATENTS 213,237   7/56   Australia.
673,866   6/52   Great Britain.

TOBIAS E. LEVOW, *Primary Examiner.*

JOSEPH REBOLD, *Examiner.*